United States Patent Office 3,057,747
Patented Oct. 9, 1962

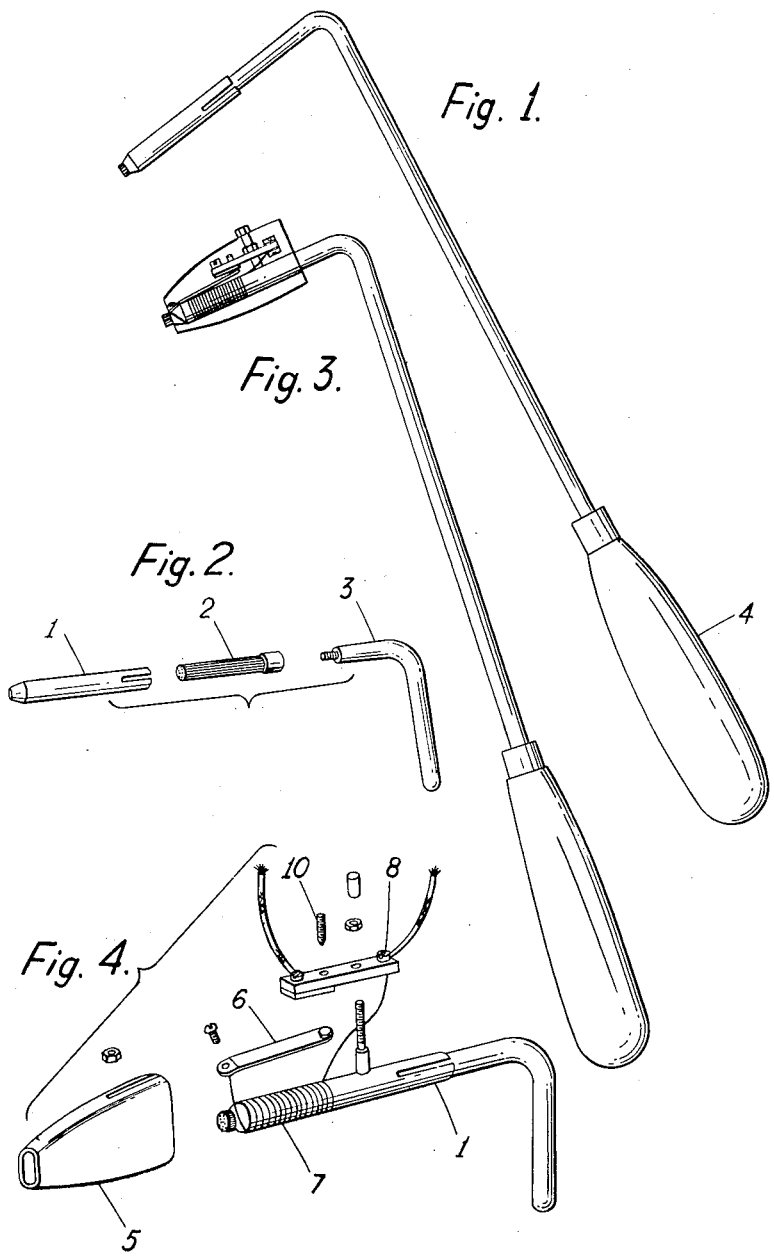

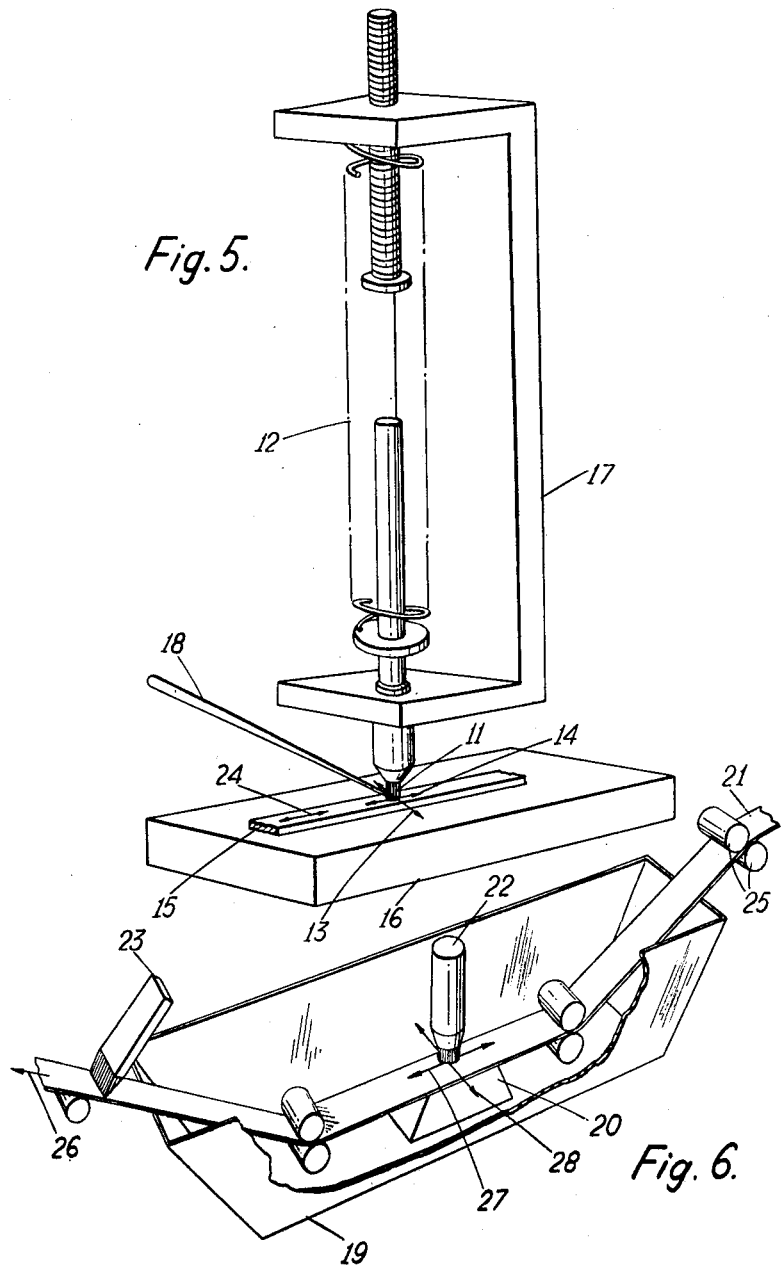

3,057,747
PROCESS OF TINNING A METAL SURFACE AND A DEVICE FOR CARRYING OUT THE PROCESS
Roger Hargreaves, Trumpet Hill, Reigate, England, assignor to Tiltman Langley Limited, Redhill, England, a British company
Filed Aug. 29, 1956, Ser. No. 606,817
Claims priority, application Great Britain Sept. 1, 1955
5 Claims. (Cl. 117—51)

In the tinning of aluminum and its alloys as a preliminary to soldering, it is common to remove the surface film of oxide by abrasion rather than by means of a flux. This technique may also be applied to other metals and alloys such as stainless steel which form refractory and protective surface films of oxide. Wire brushes are used but these tend to damage the actual metal and if the metal is only a cladding, as for example in an "Alclad" sheet, there may be a substantial reduction in its thickness. Soldering irons with equipment for imparting ultrasonic vibrations to break up the oxide layer are also used, but these are expensive.

According to the present invention the surface to be tinned is scrubbed, while immersed in molten solder, by a brush the bristles of which are of glass fibre, fused silica fibre, or any non-metallic fibre which has substantially equivalent strength, resilience, and resistance to the temperature of the molten solder, say up to 350° C. Such a brush is efficient in removing oxide and causes little damage to the metal.

Preferably the fibres are crowded together in a bundle which is enclosed in a tube and projects somewhat from one end, being moved along the tube as the bristles are gradually broken away. For example the bristles may be $1/1000$ inch diameter and form a bundle of $3/16$ inch diameter projecting $3/16$ inch from a tube.

The fibres may for ease of handling be held together in the bundle by a binder such as starch, but this is destroyed by heat and has no effect on the action of the brush.

After two metal articles have been tinned, oxide forms on the surface of the tinning. According to a further feature of the present invention two heated tinned surfaces are brought together and then brushed by a brush as already described so as to permit the tinning on the two surfaces to run together and to form a soldered joint.

The operations of brushing to assist tinning and brushing to assist soldering may be carried out by hand, but may be carried out in an apparatus in which one or more brushes are moved relatively to a workpiece or several workpieces with a linear, rotary, or more complex motion while the workpieces are immersed in solder, or heated, as required.

The accompanying drawings show examples of hand tools and apparatus for carrying out the invention. In these drawings:

FIG. 1 is a perspective view of a hand tool.
FIG. 2 is an exploded view of the operational end of the tool.
FIGS. 3 and 4 are views similar to FIGURES 1 and 2 of a modified hand tool.
FIG. 5 is a diagrammatic perspective view of one apparatus, and
FIG. 6 is a diagrammatic perspective view of another apparatus.

The hand tool shown in FIGS. 1 and 2 is intended for use on surfaces which are independently heated for example by means of a hot plate. The tool consists of a bundle of glass or fused silica bristles 2 enclosed in a slidable tube 1 and attached to the end of a shaft 3 terminating in a handle 4.

The tool shown in FIGS. 3 and 4 is similar to that shown in FIGS. 1 and 2 with the addition of a heating element fixed to the brush close to the bristles. This enables the tool to be used on small areas of surface in a manner similar to an electrically heated soldering iron. The heating element is a wire 7 wound over the tube 1 with a thin interposed layer of mica insulation. One end of the wire 7 is attached to a terminal 8 on an insulated block 9, the other end is connected to a bimetallic strip 6 which co-operates with a contact screw 10 in the block 9. The strip 6 serves as a thermostatic control with provision for adjustment by means of the contact screw 10. The heating element and thermostat are enclosed in a casing 5.

Improved thermal conduction between the heating element and the surface of a workpiece can be obtained by plating the fibres of the brush with silver, copper, or platinum and then tinning them with solder. The tube 1 should in this case be made of a material such as stainless steel which will not alloy with solder.

In the apparatus shown in FIG. 5 a workpiece 15 is supported and heated by a hot plate 16 and a brush 11 is mounted in a frame 17 and urged down on to the workpiece by a spring 12. The frame 17 is traversed or traversed and oscillated as indicated by the arrows 13 and 14 by a mechanism not shown. At the same time solder in the form of a wire 18 is fed to the area of contact between the brush 11 and the workpiece 15. The workpiece may also be moved over the hot plate 16 as indicated by the arrow 24.

The apparatus shown in FIG. 6 is intended for tinning a strip of aluminium 21. The apparatus includes a bath 19 for molten solder with a heater not shown. The strip 21 is fed through the bath by rollers 25 and is supported by a platform 20 beneath a brush 22. The direction of feed of the strip is indicated by the arrow 26. The brush 22 is given an oscillatory or more complex motion by a mechanism not shown as indicated by the arrows 27 and 28. As the tinned strip emerges from the bath, dross and excess solder are wiped away by a brush or plate 23.

In place of the brush 22 the apparatus may include a rotary cylindrical brush in which the fibres are disposed radially.

The processes and apparatus of the present invention may be employed in soldering a great variety of articles including in particular aluminium foil as thin as one quarter mil (0.00025 inch).

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A process of tinning a metal surface comprising the steps of: immersing the surface of the metal to be tinned within molten solder, and scrubbing said surface being tinned while immersed in the molten solder with a brush having a tight bundle of parallel bristles made of resilient glass fiber resistant to the temperature of the molten solder and disposed perpendicularly to said surface to break up any oxide layer on said surface.

2. A process according to claim 1, wherein said glass bristles are made of fused silica fibre.

3. The process according to claim 1 in which the surface to be tinned contains aluminium.

4. The process according to claim 1 in which the brush is moved relative to a workpiece while the workpiece is maintained at an elevated temperature.

5. A process of tinning a metal surface comprising the steps of: immersing the surface of the metal to be tinned within molten solder and scrubbing said surface while being immersed in the molten solder with a brush having a tight bundle of parallel bristles made of resilient glass fiber resistant to the temperature of the molten solder and heated adjacent to the bristles to break up any oxide layer on the metal surface to be tinned.

References Cited in the file of this patent

UNITED STATES PATENTS

| | | |
|---|---|---|
| 399,387 | Dolan | Mar. 12, 1889 |
| 1,618,996 | Powers | Mar. 1, 1927 |
| 2,001,474 | Snyder et al. | May 14, 1934 |
| 2,087,716 | Banscher | July 20, 1937 |
| 2,215,278 | Swartz et al. | Sept. 17, 1940 |
| 2,263,131 | Hoza | Nov. 18, 1941 |
| 2,281,256 | Bargfeldt et al. | Apr. 28, 1942 |
| 2,318,419 | Plott et al. | May 4, 1943 |
| 2,341,831 | Vanatta | Feb. 15, 1944 |
| 2,453,339 | Peterson | Nov. 9, 1948 |
| 2,791,669 | Ferrara | May 7, 1957 |
| 2,795,002 | Davies | June 11, 1957 |
| 2,866,069 | Kriwaczek | Dec. 23, 1958 |